United States Patent [19]

Gettel

[11] Patent Number: 5,111,660
[45] Date of Patent: May 12, 1992

[54] PARALLEL FLOW ELECTRONICALLY VARIABLE ORIFICE FOR VARIABLE ASSIST POWER STEERING SYSTEM

[75] Inventor: Roger W. Gettel, Bloomfield Hills, Mich.

[73] Assignee: Ford Motor Company, Dearborn, Mich.

[21] Appl. No.: 667,125

[22] Filed: Mar. 11, 1991

[51] Int. Cl.⁵ .................... F16D 31/02; B62D 5/06
[52] U.S. Cl. ................... 60/468; 60/494; 180/132; 180/142
[58] Field of Search ......... 60/468, 494, 385; 417/307, 310; 180/132, 141, 142

[56] References Cited

U.S. PATENT DOCUMENTS

| | | | |
|---|---|---|---|
| 3,632,232 | 1/1972 | Tomita | 417/300 |
| 3,946,562 | 3/1976 | Ross | 60/468 X |
| 4,182,125 | 1/1980 | Spivey, Jr. | 60/468 X |
| 4,289,454 | 9/1981 | Iwata | |
| 4,298,316 | 11/1981 | Strikis | 417/310 |
| 4,320,812 | 3/1982 | Takaoka et al. | 91/458 X |
| 4,470,762 | 9/1984 | Wendler | |
| 4,470,764 | 9/1984 | Anderson et al. | |
| 4,470,765 | 9/1984 | Hegler | |
| 4,471,907 | 9/1984 | Gerstmann | 137/565 X |
| 4,473,128 | 9/1984 | Nakayama et al. | |
| 4,485,883 | 12/1984 | Duffy | |
| 4,561,521 | 12/1985 | Duffy | |
| 4,570,735 | 2/1986 | Duffy | |
| 4,609,331 | 9/1986 | Duffy | 417/293 |
| 4,681,184 | 7/1987 | Suzuki et al. | 180/142 X |
| 4,691,619 | 9/1987 | Kervagoret | |
| 4,691,797 | 9/1987 | Miller | 180/141 X |
| 4,714,413 | 12/1987 | Duffy | |
| 4,796,715 | 1/1989 | Futuba et al. | 180/132 X |
| 4,887,632 | 12/1989 | Tanaka et al. | 60/468 X |

FOREIGN PATENT DOCUMENTS

| | | | |
|---|---|---|---|
| 0188756 | 11/1983 | Japan | 180/132 |
| 0045265 | 3/1984 | Japan | 180/132 |
| 0547559 | 10/1977 | U.S.S.R. | 60/494 |

Primary Examiner—Edward K. Look
Assistant Examiner—John Ryznic
Attorney, Agent, or Firm—Frank G. McKenzie; Roger L. May

[57] ABSTRACT

A power steering pump includes a housing defining an opening containing a sliding vane rotor, a cam ring and pressure plates located at each axial side of the rotor and having inlet ports connected to a source of low pressure fluid and outlet ports connected to a power steering system. The pressure control valve opens and closes an orifice of constant size connecting the pump outlet to a power steering gear. An electronically variable orifice arranged in parallel with the fixed orifice connects the pump and outlet to the power steering gear. When the control valve opens sufficiently, the pump outlet is connected to the inlet through a diffuser arranged to draw low pressure fluid into a high velocity stream of bypass fluid. Kinetic energy of the stream is used to increase static pressure in the fluid supplied to the pump inlet.

10 Claims, 5 Drawing Sheets

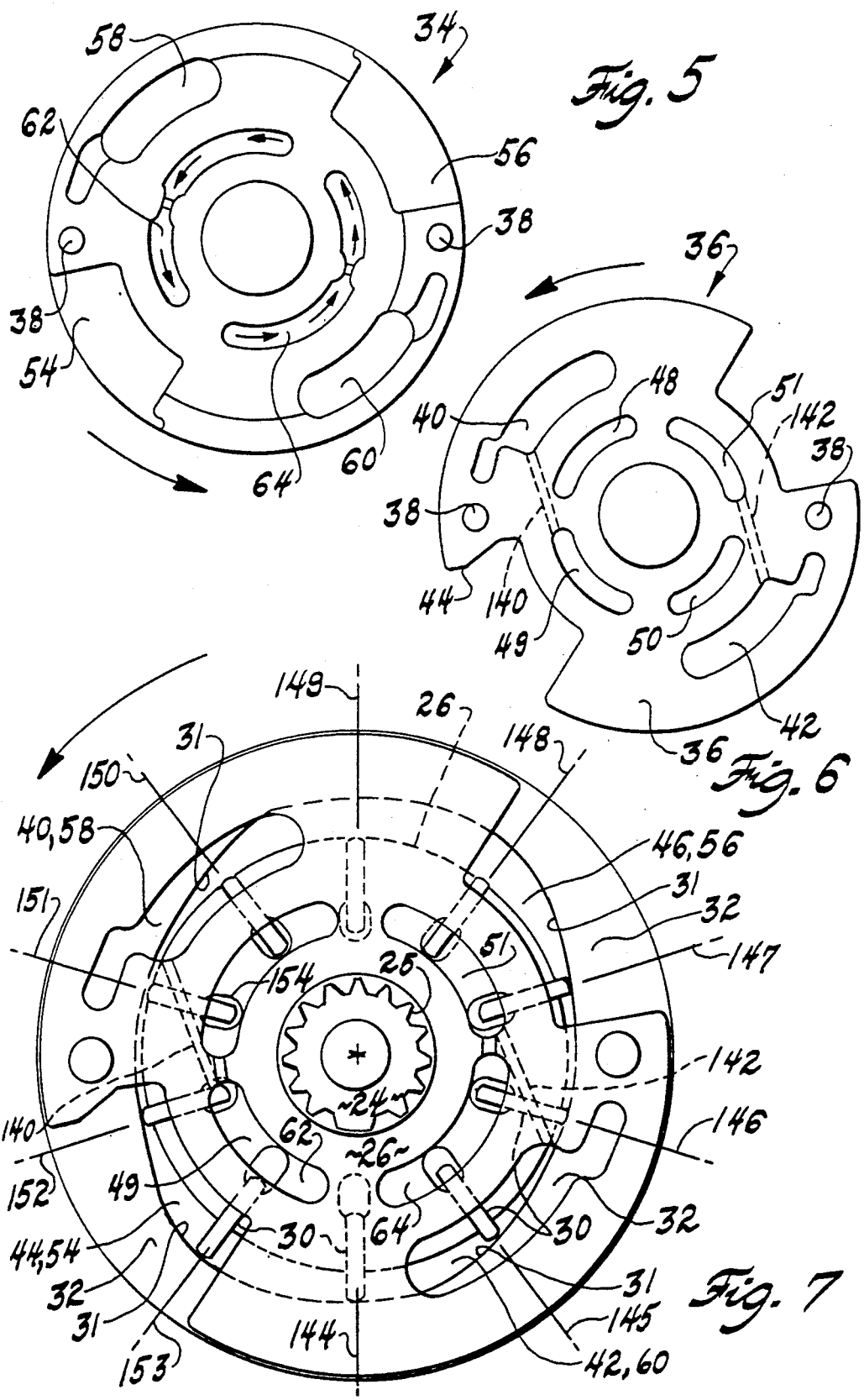

PARALLEL FLOW ELECTRONICALLY VARIABLE ORIFICE FOR VARIABLE ASSIST POWER STEERING SYSTEM

BACKGROUND OF THE INVENTION

1. Field of the Invention

This invention relates to the field of rotary vane hydraulic pumps especially those for use in an automotive power steering system. The invention pertains particularly to a technique for controlling the flow rate of the pump through a variable orifice and a constant orifice.

2. Description of the Prior Art

A constant displacement rotary vane pump of the type used for power steering systems has a flow rate proportional to rotor speed. The steering gear supplied with pressurized hydraulic fluid from the pump requires high flow rates when vehicle speed is low and low flow rates when vehicle speed is high. A conventional power steering system therefore includes a flow control valve, which is opened to maximize fluid flow to the steering gear when system pressure is low and is closed to bypass flow from the steering gear to the pump inlet when pump rotor speed is high.

Various techniques for controlling operation of the flow control valve have been developed. For example, U.S. Pat. No. 4,289,454 describes a vane pump having two outlet ports, one port being closed after the flow rate exceeds a predetermined magnitude due to an increase in speed of the rotor. The excess fluid normally passing through one of the outlet ports is returned to the pump inlet to increase the fluid flow rate to the steering gear during high speed conditions.

U.S. Pat. No. 4,470,762 describes a pump having a control that bypasses flow from the pump between a cam ring and thrust plate. A spring opens the bypass passage and a pressure plate closes the bypass passage when system pressure rises. The pump control described in U.S. Pat. No. 4,470,764 includes a spring operating on a valve spool to open bypass flow and biased by system pressure to reduce bypass flow. In the vane pump of U.S. Pat. No. 4,470,765, output flow is partially bypassed through a flow control valve. The valve is operated by system pressure to close bypass passages as system pressure rises, thereby increasing flow to the power steering system.

More recently, power steering systems include electronically variable orifices that are opened and closed in response to vehicle speed and steering wheel speed so that the flow rate to the steering gear from the pump outlet is high when the required steering assist is high, particularly at low vehicle speed, and is low when the required steering assist is low, particularly at high vehicle speed and low steering wheel speed. An example of a power steering system controlled in this way is described in U.S. Pat. No. 4,473,128 in which a bypass valve directs a portion of the fluid flow from the pump from the steering gear in response to vehicle speed and angular velocity of the steering wheel. The position of the bypass valve is controlled by a solenoid, energized and deenergized on the basis of control algorithms executed by a microprocessor. The flow control valve described in U.S. Pat. No. 4,691,619 is also operated by a solenoid, which is energized and deenergized in response to vehicle speed. A pressure modulated slide valve is hydraulically piloted by a solenoid-operated valve. Fluid flow to the steering gear is controlled entirely hydraulically in response to vehicle speed and demand requirements represented by the steering gear input.

U.S. Pat. No. 4,485,883 describes a power steering system having a bypass valve controlling the flow rate of fluid directed from the pump outlet to the pump inlet and a constant flow valve for regulating the flow of bypass fluid. This control system reduced the flow rate to the steering gear during steering maneuvers at high speed and increases the flow rate at low speed and during parking maneuvers.

A similar object is realized with the power steering systems described in U.S. Pat. No. 4,561,521; 4,570,735. A vehicle speed sensitive valve operates to deactivate a conventional flow control bypass valve by eliminating differential force on the flow control valve at speeds greater than a predetermined value. U.S. Pat. No. 4,714,413 describes a power steering system of this type. Another control system of this type employing a solenoid-operated vehicle speed sensitive valve in combination with a conventional flow control bypass valve is described in U.S. Pat. No. 4,609,331.

SUMMARY OF THE INVENTION

The flow control system for regulating the flow rate from a rotary pump to a steering gear in an automotive power steering system can be adapted to vary the magnitude of steering assist in accordance with vehicle speed, steering wheel velocity, steering wheel torque, and other measurable parameters. Generally, a variable assist power steering system includes a microprocessor accessible to electronic memory circuits containing control algorithms and signals produced by speed and position sensors. The microprocessor produces control signals supplied to a solenoid-operated flow control valve in accordance with the result of control logic produced by execution of the control algorithms. Generally, the solenoid-operated valve opens and closes size of an orifice commensurate with the required flow rate supplied to the steering gear. Conventionally, the electronically variable orifice controls the entire volume of fluid supplied from the pump to the steering gear.

A purpose of the parallel flow arrangement of the flow control system of the present invention is to reduce the volumetric flow rate controlled by the electronically variable orifice. In the flow control system of the present invention, fluid flow from the pump is controlled by a modulated flow control valve, whose output is supplied both to a fixed orifice of constant cross sectional area and to an electronically variable orifice arranged in parallel with the fixed orifice and opened and closed in accordance with the result of control algorithms executed by a microprocessor. In an arrangement of this type, the flow volume controlled by the electronically variable orifice, can be made substantially less than the flow volume supplied to the steering gear. Accordingly, the size of the electronically variable orifice is made substantially smaller than in a conventional flow control arrangement. This reduction in size results in lower cost of the electronically variable orifice system, a smaller solenoid for controlling the size of the variable orifice and a corresponding reduction in size of the associated porting to and from the variable orifice.

Additionally, the parallel flow arrangement permits an electronically variable orifice of a particular size to be used for different vehicle flow requirements over a broad range of flow rates by merely changing the size of the fixed or constant size orifice from one vehicle power steering system to another.

The flow control valve of the present invention has capacity in the conventional way, when system requirements permit, to bypass a substantial magnitude of the flow produced by the pump and to return that fluid directly to the inlet of the pump or to a reservoir connected to the inlet.

When a bypass device is used in a conventional power steering system it results in a substantial loss of kinetic energy in the fluid stream produced by the pump when the bypass fluid is returned to the low pressure reservoir or pump inlet. However, the rotary vane pump of the present invention employs a technique for converting kinetic energy in the fluid stream of the bypass fluid through use of a jet pump to increase static pressure of the fluid at the pump inlet or within a reservoir from which the pump is supplied. As the flow control valve opens to direct an increased quantity of fluid from the pump outlet directly to the inlet, rather than to the power steering gear, that bypassed fluid enters a diffuser containing a venturi wherein the velocity of the bypass fluid increases. A diffuser is hydraulically connected to a source of relatively low pressure fluid awaiting return to the pump inlet. The high velocity fluid stream within the diffuser aspirates fluid from the low pressure reservoir, the fluid streams mix within the diffuser, and the combined stream is accelerated to high speed. After Passing the venturi throat, the diffuser permits a reduction of the velocity head to an increase of the static pressure head as the diffuser expands in cross sectional area past the throat area. The flow direction is altered within return passages to further slow the bypass fluid flow stream, thereby further raising the static pressure of the fluid returned to the pump inlet.

BRIEF DESCRIPTION OF THE DRAWINGS

FIG. 5 is an end view of the lower plate showing the relative position of inlet and outlet ports, and passages to facilitate cold start priming.

FIG. 6 is an end view of the upper pressure plate showing the relative angular and radial positions of the inlet and outlet ports and the passages communicating with those of the lower pressure plate through vane slots of the rotor.

FIG. 7 is an end view superimposing the lower pressure plate, upper pressure plate, cam, rotor, vanes, and hydraulic passages connecting these.

DESCRIPTION OF THE PREFERRED EMBODIMENT

Figure 1:
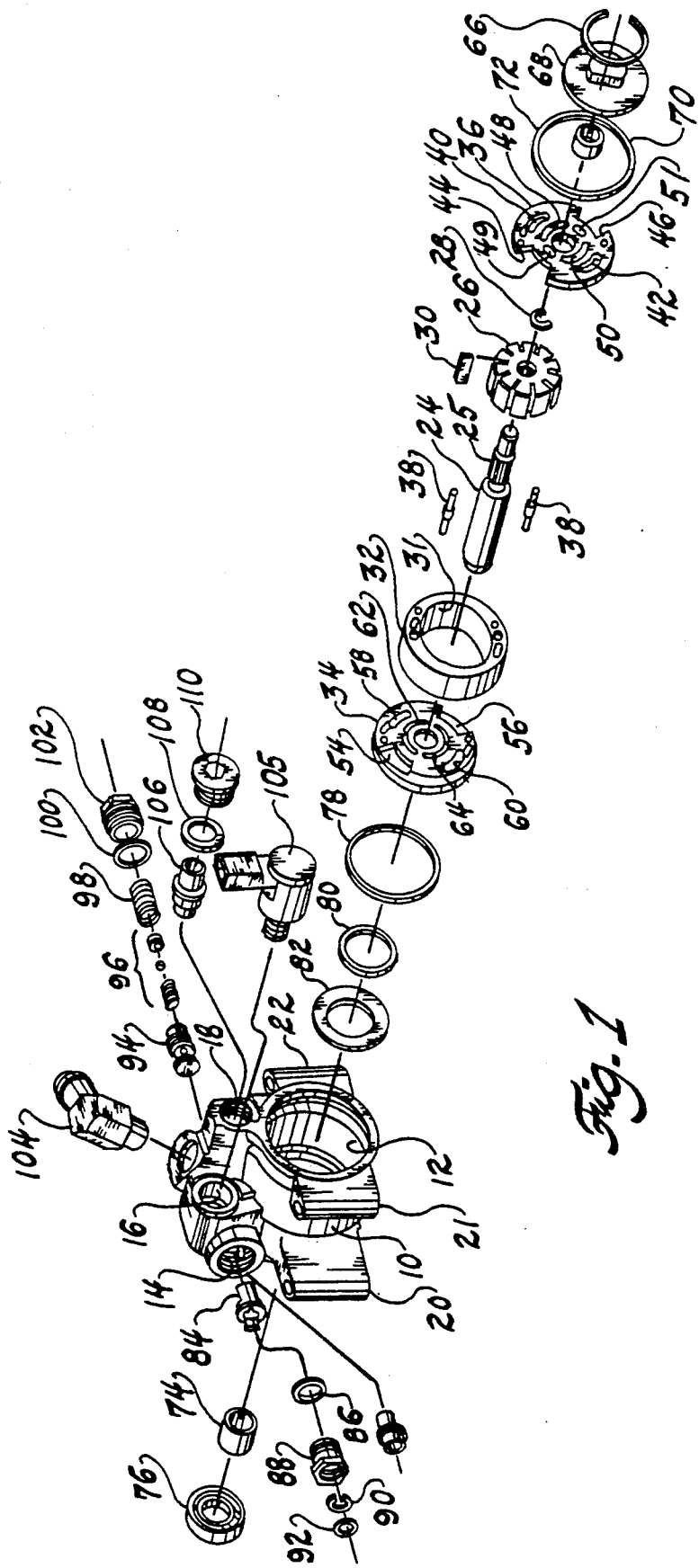
FIG. 1 is an isometric view of a power steering pump, showing its pumping components and control elements spaced axially from adjacent components.

A rotary vane hydraulic power steering pump according to this invention supplies pressurized fluid to an automotive vehicle steering gear. The pump includes a housing 10 defining a cylindrical space containing the pumping elements, a bore 14 containing a flow control valve and related components, a bore 16 communicating with bore 14 and containing an electronically variable orifice, and a diffuser passage 18. The housing includes at least three bosses 20–22, each having a cylindrical hole adapted to receive a mechanical attachment such as a bolt, which can be threaded directly to the engine block of the vehicle. In this way, the conventional bracket usually used to support a power steering pump located in position to be driven by a V-belt from the engine crankshaft can be eliminated.

The components that pump hydraulic fluid from a reservoir to the steering gear are rotatably supported on a shaft 24, driven by an endless drive belt from an engine and rotatably connected by a splined connection to a rotor 26 fixed in position on the shaft by a snap ring 28. The rotor has ten radially sliding vanes, held in contact with the inner surface of a cam ring 32 having two arcuate zones extending angularly in rise or inlet quadrants and two zones of lesser radial size extending angularly in fall or outlet quadrants mutually separated by the inlet quadrants. A lower pressure plate 34 and an upper pressure plate 36 are fixed in position radially with respect to the cam 32 by alignment pins 38. Formed through the thickness of the upper pressure plate are arcuate outlet ports 40, 42 communicating with an outlet port opening to the flow control valve bore 14, inlet ports 44, 46 and arcuate passages 48, 50 for use in cold starting priming. The lower pressure plate has inlet ports 56, 54 formed through its thickness, outlet ports 58, 60 and arcuate flow passages 62, 64 hydraulically connected to passages 48, 50.

A wire retaining ring 66 seats within a recess at the end of the pump housing to hold in position a pump cover 68. Bushing 70 supports shaft 24 on a recess in the inner surface of the cover. Seal 72 prevents the passage of hydraulic fluid.

The opposite end of the rotor shaft is supported rotatably in a bushing 74, which is supported on the housing; a shaft seal 76 prevents flow of hydraulic fluid from the pumping chambers. Located adjacent the lower pressure plate on the opposite side from the cam are an inner seal 78, an outer seal 80, and a Belleville spring 82, which develops an axial force tending to force mutually adjacent surfaces of the various components into abutting contact.

Located within bore 14 are a discharge port orifice 84, seal 86, connector 88, a retaining ring 90, and O-ring seal 92. Also located within bore 14 is a relief valve spool 94, a coiled compression spring, ball, ball seat and a larger compression spring 98 urging spool 94 toward a high speed position where the flow control valve is open. A Teflon seal 100 and plug 102 close the adjacent end of the bore mechanically and hydraulically. A tube assembly 104 connects a tube carrying fluid from the steering gear to the pump housing, through which it passes in suitable ports to the pumping chamber. An actuator assembly 105 for an electronically variable orifice is engaged by screw threads in bore 16.

A system for supercharging fluid at the pump inlet includes a diffuser 106, seal 108 and plug 110 engaged with screw threads formed in bore 18 of the housing.

Figure 2:
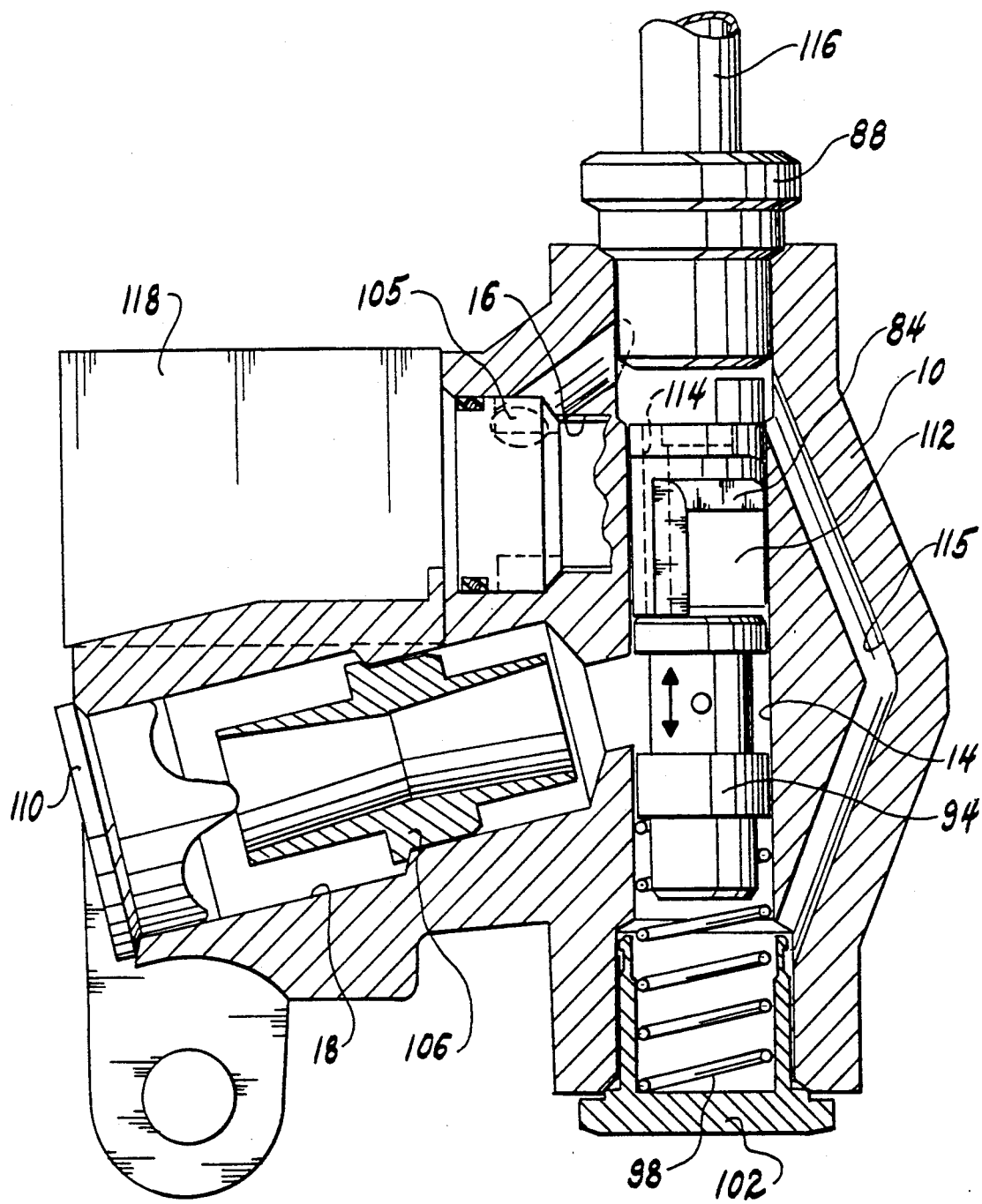
FIG. 2 is a cross section through the power steering relief valve and adjacent housing area with the components disposed in the low speed position.

Referring now to FIG. 2, the outlet ports in the pressure plates are connected through port 112 to bore 14 in which relief valve 94 is located. Orifice 84 has an axially directed passage 114, which continually connects port 112 to the pressure tube 116, which carries high pressure hydraulic fluid to the steering gear from the pump.

Figure 4:
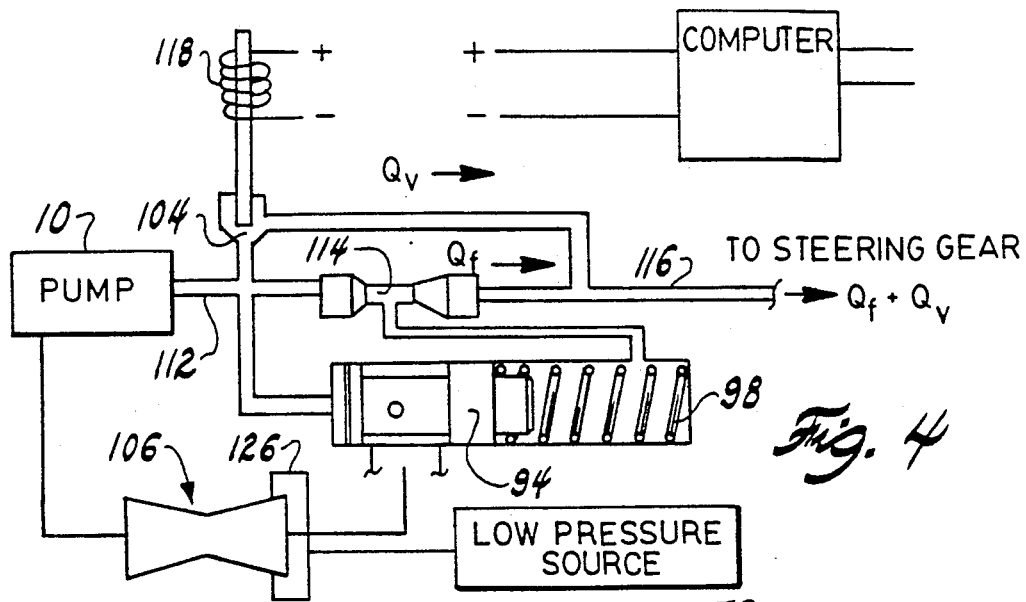
FIG. 4 is a schematic diagram showing the parallel flow arrangement of a constant area orifice and variable area orifice between the pump outlet and the steering gear.

Electronically variable orifice assembly 105 includes a solenoid 118, operated by an output signal produced by a microprocessor accessible to control algorithms and input signals produced by speed sensors, which produce signals representing the speed of the vehicle and steering wheel. As these control algorithms are executed, an electronically variable orifice 105 opens and closes communication between port 112 and pressure tube 116. In this way, the fixed orifice of passage 114 and the electronically variable orifice 105 are in parallel flow arrangement between Passage 112 and the outlet to the steering gear. Therefore, the flow rate through passage 114 can be adjusted through operation of the pressure relief valve independently and without affecting the position of the electronically variable orifice. FIG. 4 illustrates the arrangement of the fixed orifice and variable orifice between the pump outlet and steering gear.

The flow rate through port 112 is proportional to the speed of the pump shaft 24 and to the speed of the engine to which that shaft is connected. An orifice aperture 114 produces a pressure drop relative to pressure at port 112. Pressure downstream of aperture 114, the steering system pressure, is fed back in passage 115 to the end of the spool contacted by spring 98. A force resulting from the feedback pressure adds to the spring force on the spool. When pump speed increases, hydraulic system pressure in port 112 increases, thereby forcing spool 94 against the effect of compression spring 98 and the feedback pressure force. This action opens passage 114 to the steering gear and adds the flow through passage 114 to the flow through the electronically variable orifice from port 112. System pressure carried in passage 115 to the end of spool 94 opposes the pressure force on the spool tending to open the valve.

Figure 3:
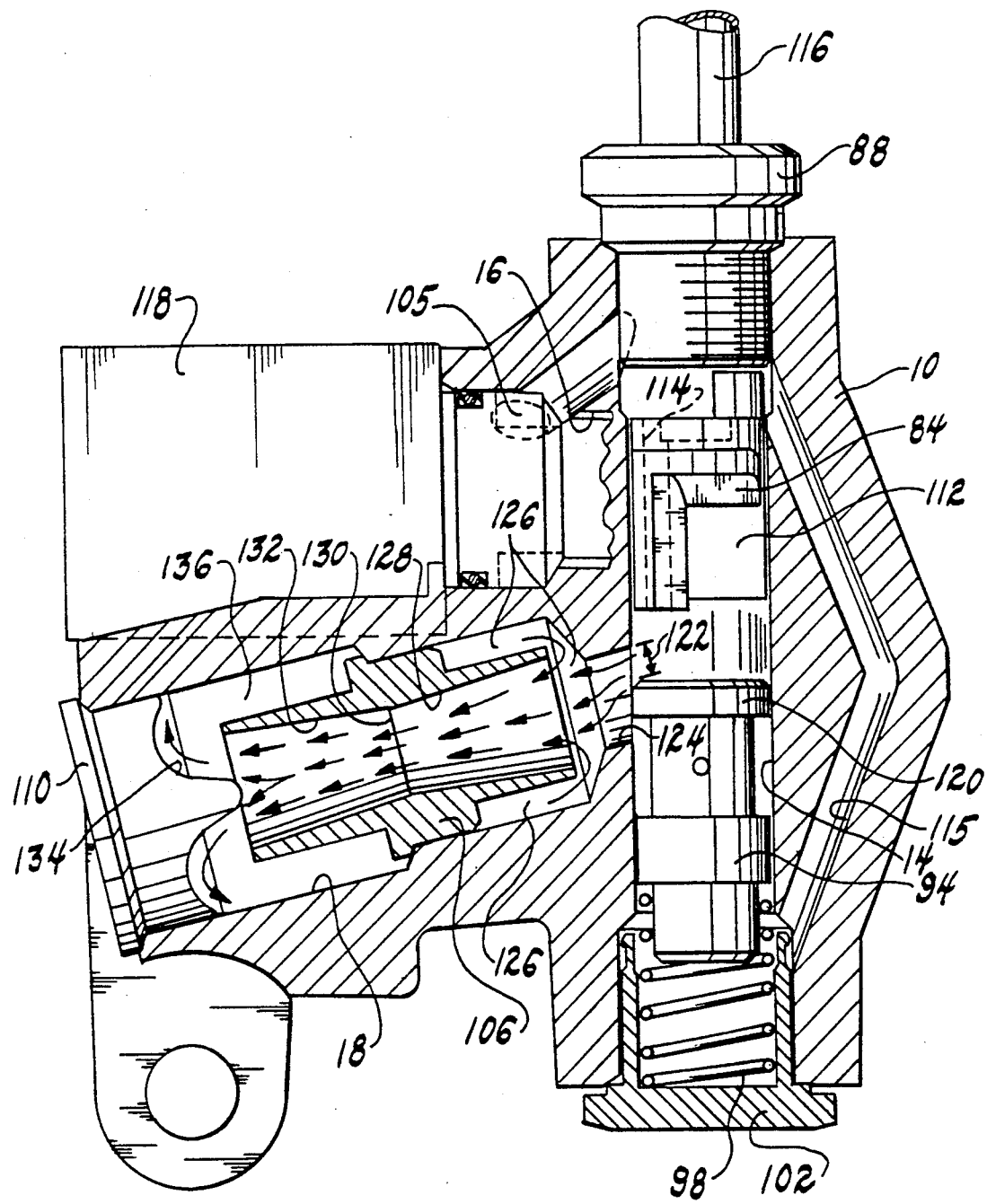
FIG. 3 is a cross section through the power steering relief valve and adjacent housing with the components disposed in the high speed position.

FIG. 3 shows spool 94 in a more fully opened position from that of FIG. 2, where land 120 opens the axial end of passage 114. When valve spool 94 moves to the high speed position of FIG. 3, bypass port 122, a passage that connects bore 114 and inlet passage 124 to the diffuser 106, opens. As relief valve 94 opens, the size of the bypass port 122 increases progressively, thereby increasing the flow rate through the diffuser. The annular space 126 between diffuser 106 and bore 18 and the cylindrical space between bypass port 122 and the diffuser entrance communicates with low pressure fluid in a reservoir or a return line, such as the line connected to fitting 104, returning fluid to the inlet ports and the pumping chambers, the space between the rotor vanes, rotor and inner surface of the cam. When bypass port 122 opens, fluid at an extremely high flow rate enters space 126 and contracting portion 128 of the diffuser. This action produces a jet pump, in which the stream of low pressure fluid from space 126 and high pressure fluid mix. The combined stream increases in velocity in the diffuser up to the diffuser throat 130 due to the reduction in cross sectional area along the length of portion 128. The combined fluid stream expands after passing the throat along the length of the expansion portion 132, the diffuser causing a reduction in velocity of the fluid, a conversion of the kinetic energy in the fluid, and an increase in static pressure. Plug 110 is formed with a contour 134 that directs fluid from the exit of the diffuser into an annular zone 136, which is connected directly to the inlet ports of the pumping chamber.

Whereas, in a conventional pump of this type, low pressure fluid in a reservoir enters the pumping chambers at low or substantially zero pressure, the jet pump effect produced by high velocity stream of excess bypass fluid from the pressure relief valve combined with low pressure fluid returning from the power steering system supercharges fluid entering the pump inlet and increases the overall efficiency of the pump. Instead of dissipating kinetic energy in the stream of high pressure fluid produced when the pump operates at high speed by returning it to a low pressure reservoir, energy in that fluid stream is used first to draw fluid from the reservoir or return line into the high velocity stream. Then the combined fluid stream velocity is increased by passing the stream through a first contracting portion of the diffuser and increasing static pressure by allowing the high velocity fluid stream to expand through the diffuser and to be carried in the high pressure-low velocity to the inlet of the pumping chamber. Test results using this supercharging technique show that when the power steering system pressure is operating at approximately 85 psi, pressure in the fluid stream between the diffuser and the inlet to the pumping chambers is approximately 40 psi.

Details of the pressure plates are shown in FIGS. 5 and 6. Lower pressure plate 34 has two diametrically opposite inlet ports 54, 56 and two diametrically opposite outlet ports 58, 60, each outlet port spaced approximately an equal angular distance from the inlet ports. Two arcuate, diametrically opposite channels 62, 64, located radially and angularly at a position to communicate with terminal holes at the radial base of the rotor slots, are formed in the face of the lower plate adjacent the rotor surface.

The upper pressure Plate 36 includes inlet ports 44, 46 radially and angularly aligned with the corresponding inlet ports of the lower pressure plate, and outlet Ports 40, 42 radially and angularly aligned with outlet ports 58, 60, respectively. The upper pressure plate has two pairs of passages 48, 49 and 50, 51 aligned angularly and radially with the terminal holes at the radially inner end of the rotor slots and with channels 62, 64, respectively, of the lower pressure plate. Cover 68 includes Passages 140, 142, which connect passages 49 and 51 to the pump outlet ports 40 and 42, respectively.

FIG. 7 shows ten rotor vanes 30 located within radially directed slots in each of ten locations 144–153. In normal operation, the radial tip of each vane contacts the inner surface 31 of cam 32 so that the vanes rise within the slots twice during each revolution and fall within the slots twice during each revolution. The vanes rise within inlet quadrants that include the inlet ports 44, 46, 54, 56; the vanes fall within outlet quadrants that include outlet ports 40, 42, 58, 60; the inlet quadrants being spaced mutually by an outlet quadrant. The radial end of each slot includes a terminal hole 154 extending through the axial thickness of the rotor and along a radial depth located so that each terminal hole passes over the arcuate passage 62, 64 of the lower pressure plate and the arcuate passages 48–51 of the upper pressure plate. The terminal holes, therefore, connect hydraulically the passages of the lower pressure plate that are adjacent the lower surface of the rotor 26 and the passages of the upper pressure plate that are adjacent the upper surface of the rotor.

In operation, when rotor rotation stops, the vanes located above the horizontal center line of the rotor slide along the radial length of the slot toward the terminal hole, due to the effect of gravity, and the vanes below the horizontal center line remain in contact with the inner surface of the cam ring. The fit between the vanes and their slots is a close tolerance fit. At low temperature, the viscosity of the power steering fluid is large.

When a conventional power steering pump rotor is started with the vanes in this position and at low temperature, the vanes at positions 148-150 remain at the bottom of the slot and outlet passages 40, 58 are connected to the inlet passages 46, 56 because those vanes are not in contact with the cam surface. The tightness of the fit of the vanes within the slots and the viscosity of the fluid operate in opposition to the effect of centrifugal force tending to drive the vanes radially outward. However, as the rotor rotates counterclockwise as viewed in FIG. 7, hydraulic fluid in the terminal holes above those vanes in contact with the cam is displaced as each such vane falls within the slot as those vanes enter the fall or outlet quadrants. As the vanes fall, they force fluid present within the terminal holes and rotor slots toward passages 62, 64 in the lower plate. There is no flow toward the upper plate because passages 48, 50 are blind. Within passages 62, 64 flow is in the direction of rotation, i.e., toward the rise or inlet quadrant. Because ports 48, 50 are blind, the only connection across the rotor between passages 62, 64 and outlet passages 40, 42 is through the axial length of the terminal holes in the inlet quadrant where the vanes are attempting to rise in their slots. To reach the outlet passages 40, 42, fluid pumped from the vane slots in the fall or inlet quadrant then crosses the rotor through the terminal holes at the radial end of those slots located in the inlet quadrant, i.e., from passages 62, 64 of the lower plate to passages 49, 51 of the upper plate.

Fluid pumped from the vane slots and terminal holes by the vanes in the fall quadrants of the cam applies a pressure in the terminal hole urging vanes within the rise quadrants radially outward into contact with the cam surface. When viscosity and friction forces tending to hold vanes near the bottom of the rotor slots exceed forces tending to move the vane radially outward, the pressure below the vane in each slot is a maximum on the axial side of the rotor adjacent the lower pressure plate and declines due to pressure drop along the axial length of the rotor.

Figure 8:
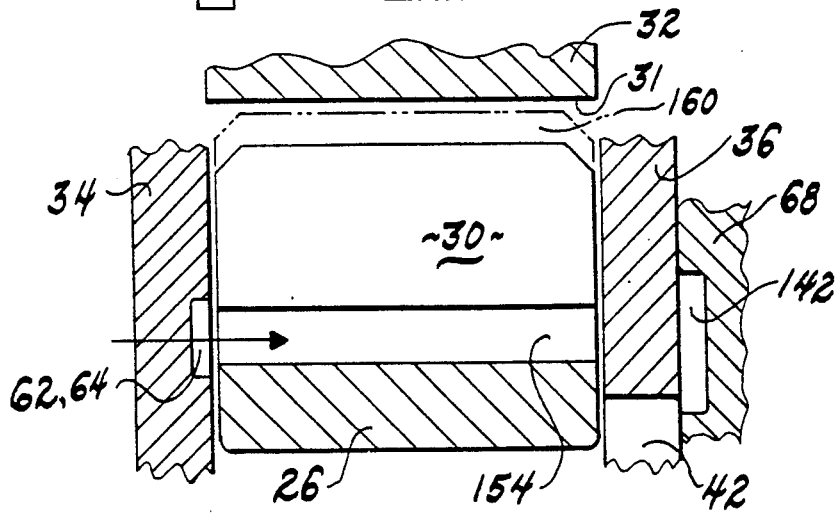
FIG. 8 is a partial cross section taken along the axis of the rotor shaft through the pressure plates rotor and cam.

An explanation of the hydraulic principles operating to cause all of the vanes of the pump to move outward into contact with the cam surface during a cold start condition is explained with reference to FIGS. 8 and 9. Fluid pumped by the vanes falling within their slots is pumped in the direction of rotor rotation across the axial length of the rotor through the terminal holes from the lower pressure plate to the blind ports of the upper pressure plate and then through passages 140, 142 in the cover to the outlet ports in the upper pressure plate. FIG. 8 shows the condition where a rotor vane is held at the bottom of the terminal hole due to friction and viscosity and has radially directed hydraulic pressure distributed along its length tending to move the vane outward in opposition to the forces holding the vane at the bottom of the terminal hole.

Figure 9:
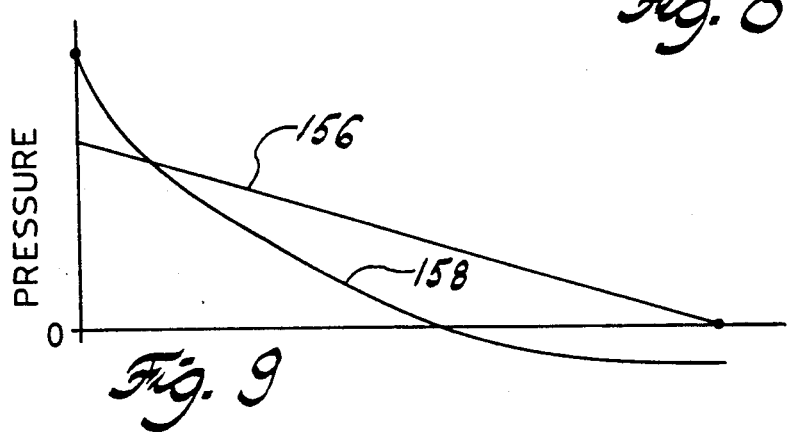
FIG. 9 is a graph representing the variation of pressure in the rotor vane slot along the axial length of the terminal hole.

Curve 156 in FIG. 9 represents the variation of pressure within the terminal hole between the upper pressure plate and the lower pressure plate. When the vane is located at the bottom of the terminal hole, a pressure drop results because of fluid friction associated with the high viscosity fluid along the axial length of the terminal hole 154. At the end of the terminal hole adjacent the upper pressure plate, the static pressure of the hydraulic fluid in the terminal hole will be substantially zero because the terminal hole at the upper pressure plate is connected by passage 142 to the outlet passage 42. Since vanes at positions 147, 148 and 149 are not contacting cam surface 31 but instead are located near the bottom of the slots, the outlet ports 40, 42, in the upper pressure plate are connected within the rotor to inlet ports 44, 46 where pressure is substantially atmospheric pressure. Curve 156 is inclined because of the pressure drop that occurs across the axial length of the vane as fluid is pumped through the terminal hole.

Pressure forces pumped by the falling vanes in the direction of rotation to the vanes within the rise quadrant of the cam tend to force those vanes radially outward. Curve 156 represents the variation of pressure in the terminal hole below the vanes as they begin to move from the terminal holes radially outward toward surface 31. A vane in the intermediate position 160, between a position at the bottom of the rotor slot and a position in contact with surface 31, is indicated in FIG. 8. Curve 158 shows a pressure drop along the length of the terminal hole from relatively high pressure within a terminal hole near the upper pressure plate and declining rapidly to a position between the pressure plates where pressure in the terminal hole passes through zero pressure and declines to a region of negative pressure as axial distance toward the upper plate increases. Negative pressure within the terminal hole causes fluid to flow from the interconnected inlet port 44, 46 and outlet ports 40, 42 through passages 140, 142 to the terminal hole 154. The volume of fluid flowing into each terminal hole is sufficient to refill the hole and is equal to the volume caused by the radially outward displacement of the vane.

This process is repeated when the vane passes again to the succeeding rise portion of the rotor between vane positions 152 and 153. Pressure continually increases within the terminal hole because fluid is pumped forward in the direction of rotation from the vane within the fall position, such as the vanes in positions 150, towards the vanes in the rise portion of the rotor at positions 152, 153 until vanes in the rise quadrant move radially outward into contact with the cam. Each time vanes that are not yet in contact with the cam move outward a portion of the distance toward the cam, volume displaced within the terminal hole is replaced with an equal volume of fluid flowing into the terminal hole below such a vane as previously described. This process continues with two such cycles in each rotor revolution until all of the vanes that have fallen to the bottom of the their slots while the rotor was stopped have been driven outward into contact with surface 31 of the cam.

Having described a preferred embodiment of my invention, what I claim and desire to secure by U.S. Letters Patent is:

1. A system for supplying fluid to a power steering gear, comprising:

a fluid pressure source having an outlet port through which fluid leaves said source;
an inlet passage connectable to the power steering gear, through which fluid enters the steering gear;
electronically variable orifice means having a first orifice located between the pressure source outlet port and the steering gear inlet passage, connecting the inlet passage to the outlet port;
a second orifice having a flow area of fixed size, located between he pressure source outlet port and the steering gear inlet passage, disposed in parallel flow arrangement with the electronically variable orifice means;
a bypass port;
flow control valve means located between the pressure source outlet port and the bypass port, for adjusting the flow area of the bypass port in accordance with the magnitude of fluid pressure supplied o the steering gear;
a source of low pressure fluid;
a diffuser passage means communicating with the bypass port and the low pressure fluid source, fluid passing through the bypass port mixing in said diffuser passage means with fluid from the low pressure source; and
bypass diffuser means supplied with fluid from the diffuser passage means, having a constricted flow area located along its length, or converting inertia energy of the fluid a passing therethrough to an increase of fluid pressure delivered to the fluid pressure source.

2. The system of claim 1 wherein the size of the second orifice is constant throughout the full range of operation, and the electronically variable orifice means includes an electrically energized solenoid means connected to a valve element movable into and out of said first orifice, whereby the effective flow area of the first orifice changes in accordance wit he magnitude of electric power supplied to he solenoid.

3. The system of claim 1 wherein he flow control valve means includes:
a cylinder communicating with the pressure source outlet port and the bypass port, said ports spaced mutually along he cylinder length;
a spring located int he cylinder;
a spool located int he cylinder, communicating with pressure at the pressure source outlet port, biased by the spring for sliding movement in the cylinder responsive to the magnitude of pressure at the pressure source outlet port, having a control surface that changes the size of a flow area connecting the bypass port and the cylinder as the position of said control surface changes within the cylinder.

4. The system of claim 1 wherein the bypass diffuser means defines a flow passage extending axially from the diffuser passage means, said flow passage having a first portion leading tin the flow direction to a throat along which first portion the flow area decreases as distance form the diffuser passage means toward the throat increases, and a second portion extending int eh flow direction from the throat along which second portion the flow area increases as distance from the diffuser passage means and throat increases.

5. The system of claim 4 wherein the bypass diffuser means has a surface directed away from the flow direction, located near the end of the second portion in the flow stream, for changing the direction of flow as fluid leaving the bypass diffuser strikes said surface.

6. A system for supplying fluid to a power steering gear, comprising:
a fluid pressure source having an outlet port through which fluid leaves said fluid pressure source and an inlet normally at relatively low pressure;
electronically variable orifice means having a first orifice located between the pressure source outlet port and the steering gear, hydraulically connecting the steering gear to the outlet port; and
a second orifice having a flow area of fixed size, located between the pressure source outlet port and the steering gear, disposed in parallel flow arrangement with the electronically variable orifice means;
bypass port means for directing fluid from the outlet port to a low pressure side of the pressure source;
flow control valve means located between the pressure source outlet port and the bypass port means, for adjusting the flow area of the by-ass port means in response to the magnitude of fluid pressure supplied to the steering gear;
a source of low pressure fluid awaiting entry to the low pressure side of the pressure source;
diffuser passage means communicating with the bypass port means and the low pressure fluid source, fluid passing through the bypass port means in said diffuser passage means with fluid from the low pressure source; and
bypass diffuser means communicating with the diffuser passage means, having a constricted flow area located along its length, for converting kinetic energy of the fluid passing therethrough to an increase of fluid pressure at the inlet of the fluid pressure source.

7. The system of claim 6 wherein the flow control valve means includes:
a cylinder communicating with the pressure source outlet port and the bypass port, said ports spaced mutually along the cylinder length;
a spring located in the cylinder;
a spool located int eh cylinder, communicating with pressure at the pressure source outlet port, biased by the spring for sliding movement in the cylinder responsive to the magnitude of pressure at the pressure source outlet port, having a control surface that moves past the bypass port to open, close and change the size of a flow area connecting the bypass pot and the cylinder as the position of said control surface changes within the cylinder.

8. The system of claim 6 wherein the bypass diffuser means defines a flow passage extending axially in the flow direction from the diffuser passage means, said flow passage having a first portion leading in the flow direction to a throat, the flow area of said first portion deceasing as distance from eh diffuser passage means toward the throat increases, and a second portion extending in the flow direction from the throat, the flow area of said second portion increasing as distance from the diffuser passage means and throat increases.

9. The system of claim 8 wherein the bypass diffuser means has a surface directed away from the flow direction, said surface being located near the end of the second portion, for changing the direction of flow leaving the bypass diffuser as said flow strikes said surface.

10. A flow control system for supplying fluid to a power steering gear, comprising:
a fluid pressure source having an outlet port through which fluid leaves said source;

electronically variable orifice means having a first orifice located between the pressure source outlet port and the steering gear inlet passage, connecting the inlet passage to the outlet port; and a second orifice having a flow area of fixed size, located between the pressure source outlet port and the steering gear inlet passage, disposed in parallel flow arrangement with the electronically variable orifice means;

a bypass port spaced from the pressure source outlet port;

a flow control valve comprising a cylinder communicating with the pressure source outlet port and the bypass port, a spring located in the cylinder, a spool located in the cylinder, said spool communicating with pressure at the pressure source outlet port, biased by the spring for sliding movement in the cylinder responsive to the magnitude of pressure at the pressure source outlet port, having a control surface that opens, closes and changes the size of a flow area connecting the bypass port and the cylinder as the position of said control surface changes within the cylinder;

a source of low pressure fluid;

a diffuser passage communicating with the bypass port and the low pressure fluid source, fluid passing through the bypass port mixing in said diffuser passage with fluid from the low pressure source;

bypass diffuser means supplied with fluid from the diffuser passage means, defining a flow passage extending axially from the diffuser passage, said flow passage having a first portion leading in the flow direction to a throat along which first portion the flow area decreases as distance from the diffuser passage means toward the throat increases, and a second portion extending in the flow direction from the throat along which second portion the flow area increases as distance from the diffuser passage means and throat increases.

* * * * *